US011866057B2

(12) United States Patent
Zhang

(10) Patent No.: US 11,866,057 B2
(45) Date of Patent: Jan. 9, 2024

(54) GARAGE MODE CONTROL UNIT, CONTROL SYSTEM AND CONTROL METHOD

(71) Applicant: Robert Bosch GmbH, Stuttgart (DE)

(72) Inventor: Wang Zhang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/769,654

(22) PCT Filed: Oct. 30, 2018

(86) PCT No.: PCT/EP2018/079654
§ 371 (c)(1),
(2) Date: Jun. 4, 2020

(87) PCT Pub. No.: WO2019/129414
PCT Pub. Date: Jul. 4, 2019

(65) Prior Publication Data
US 2020/0369286 A1  Nov. 26, 2020

(30) Foreign Application Priority Data
Dec. 26, 2017  (CN) ......................... 201711429765.7

(51) Int. Cl.
B60W 50/00    (2006.01)
B60W 30/08    (2012.01)
B60W 30/182   (2020.01)
B60W 40/105   (2012.01)
B60W 50/08    (2020.01)

(52) U.S. Cl.
CPC ........ *B60W 50/0098* (2013.01); *B60W 30/08* (2013.01); *B60W 30/182* (2013.01); *B60W 40/105* (2013.01); *B60W 50/082* (2013.01); *B60W 2050/0075* (2013.01); *B60W 2555/20* (2020.02)

(58) Field of Classification Search
CPC ..... B60W 2050/0075; B60W 2555/20; B60W 30/08; B60W 30/018; B60W 50/0098; B60W 50/082; B60W 40/182
See application file for complete search history.

(56) References Cited

U.S. PATENT DOCUMENTS 10,474,904  B1*  11/2019  Correnti ............. H04N 5/23206
2014/0379214 A1*  12/2014  Schallmeier ......... B60G 17/016
701/37

(Continued)

FOREIGN PATENT DOCUMENTS

CN  1736786 A   2/2006
CN  105299210 A  2/2016
(Continued)

Primary Examiner — Jeff A Burke
Assistant Examiner — Zachary Joseph Wallace
(74) Attorney, Agent, or Firm — Maginot, Moore & Beck LLP

(57) ABSTRACT

The disclosure discloses a garage mode control unit, system and method capable of preventing vehicle miss-acceleration in narrow site. The control method comprises the steps that vehicle environment information is received; whether a vehicle is in the narrow site or not is judged according to the vehicle environment information; and the vehicle is controlled according to a garage mode when the condition that the vehicle is in the narrow site is judged.

17 Claims, 2 Drawing Sheets

(56) References Cited

U.S. PATENT DOCUMENTS

| | | | |
|---|---|---|---|
| 2018/0022345 A1* | 1/2018 | Seo | B60T 7/12 |
| | | | 701/2 |
| 2018/0162385 A1* | 6/2018 | Seo | B60W 30/06 |
| 2018/0345955 A1* | 12/2018 | Kim | B60R 1/00 |
| 2019/0072974 A1* | 3/2019 | Hwang | G05D 1/0255 |
| 2020/0122718 A1* | 4/2020 | Seimiya | B60W 30/06 |

FOREIGN PATENT DOCUMENTS

| | | |
|---|---|---|
| CN | 105774585 A | 7/2016 |
| CN | 105807702 A | 7/2016 |
| JP | H4-123199 A | 4/1992 |
| JP | 2004-108937 A | 4/2004 |
| JP | 2006-335239 A | 12/2006 |
| JP | 2007-55378 A | 3/2007 |
| JP | 2009-193293 A | 8/2009 |
| JP | 2010-287153 A | 12/2010 |

* cited by examiner

GARAGE MODE CONTROL UNIT, CONTROL SYSTEM AND CONTROL METHOD

This application is a 35 U.S.C. § 371 National Stage Application of PCT/EP2018/079654, filed on Oct. 30, 2018, which claims the benefit of priority to Serial No. CN 201711429765.7, filed on Dec. 26, 2017 in China, the disclosures of which are incorporated herein by reference in their entirety.

The present application relates to a garage mode control unit, control system and control method for preventing erroneous acceleration of a vehicle in a cramped place.

BACKGROUND

As is well known, when parking a vehicle in a parking place such as a garage, or some other cramped place, some drivers lose their sense of direction due to nervousness or a lack of experience, are unaware of the steering angle of the wheels currently being steered, and depress the accelerator pedal, mistaking it for the brake pedal. These situations easily lead to loss of control of the vehicle, causing an accident. Moreover, sometimes a driver finds, when parking a vehicle, that the vehicle does not move in the direction he or she expected, and wants to brake the vehicle and then change the vehicle's direction of movement, but abruptly depresses the accelerator pedal, causing the vehicle to accelerate in the wrong direction. This easily results in the vehicle crashing into nearby vehicles, installations or even people.

Some automatic driving systems and automatic parking systems in the prior art can prevent accidental acceleration when parking. However, these systems are generally always expensive, causing the selling price of the vehicle to increase. In addition, there is also an automatic emergency braking system which can automatically brake a vehicle in an emergency; such a system can avoid accidental acceleration when parking, but is a passive, remedial technology, and might cause a driver to feel uncomfortable or scared.

It must also be pointed out that accidents might also sometimes occur due to a driver depressing the accelerator pedal, mistaking it for the brake pedal, when moving a vehicle out of a cramped place.

SUMMARY

The object of the present application is to provide a garage mode control technology, which can actively avoid erroneous acceleration when controlling a vehicle in a cramped place, at a low cost.

To this end, according to one aspect of the present application, a garage mode control unit is provided, comprising: an information transmission port, for receiving detection information, the detection information comprising vehicle environment information and vehicle state information; and an internal processing module, which determines whether a vehicle is in a cramped place on the basis of the vehicle environment information, and upon determining that the vehicle is in a cramped place, generates a garage mode control signal and issues the garage mode control signal via the information transmission port;
wherein the garage mode control signal comprises a garage mode trigger signal, and a vehicle control parameter in a garage mode.

According to one feasible embodiment, the vehicle environment information comprises a parking radar signal.

According to one feasible embodiment, the vehicle environment information further comprises optional camera information, GPS information and vehicle separation sensor information.

According to one feasible embodiment, the vehicle environment information further comprises an ambient brightness signal and/or a rain quantity sensor signal.

According to one feasible embodiment, the vehicle state information comprises some, preferably all, of the following information: a braking torque, motive power source torque, motive power source rotation speed, vehicle speed, wheel speed, current gear, degree of opening of an accelerator pedal, braking signal switch and steering wheel rotation angle.

According to one feasible embodiment, the vehicle state information further comprises: a wheel acceleration, transmission ratio and central differential torque.

According to one feasible embodiment, the vehicle control parameter comprises: a vehicle speed limit value, a target gear, a motive power source target torque and a target braking force; the vehicle control parameter is determined principally on the basis of the vehicle state information (and may also take into account a factor of the vehicle environment information).

According to one feasible embodiment, the internal processing module automatically adjusts the vehicle control parameter on the basis of the vehicle state information.

According to one feasible embodiment, the vehicle speed limit value when the vehicle is advancing is approximately 20 kph, and the vehicle speed limit value when the vehicle is reversing is approximately 5-10 kph.

According to one feasible embodiment, the internal processing module adjusts the vehicle speed limit value on the basis of the vehicle environment information.

According to one feasible embodiment, when the internal processing module determines that the vehicle speed is increasing towards the vehicle speed limit value and exhibits a tendency towards exceeding the vehicle speed limit value, a signal is also issued to activate a vehicle braking system to brake the vehicle.

According to one feasible embodiment, the garage mode control signal further comprises: if a driver has not depressed an accelerator pedal, setting a vehicle braking system to a braking standby state, in particular a critical braking state.

According to one feasible embodiment, the garage mode control signal further comprises an audio and/or video signal for prompting a driver about the garage mode.

According to one feasible embodiment, the garage mode control unit is connected to a vehicle data bus in a manner allowing signal transmission, and is integrated in a vehicle control unit or connected to the vehicle control unit in a manner allowing signal transmission, the vehicle control unit being: a whole-vehicle control unit; or a vehicle motive power source management unit, such as a management unit of a vehicle drive electric machine and/or an engine; or an electronic vehicle body stability system.

According to another aspect of the present application, a garage mode control system is provided, comprising the garage mode control unit described above, and an information detection element and a human-machine interface which are each connected to the garage mode control unit in a manner allowing signal transmission.

According to another aspect of the present application, a garage mode control method is provided, comprising: receiving vehicle environment information; determining whether a vehicle is in a cramped place on the basis of the vehicle environment information; controlling the vehicle in a garage mode when it is determined that the vehicle is in a cramped place.

The garage mode control method of the present application may be implemented by means of the garage mode control unit or garage mode control system described above. Thus, various features described above in relation to the garage mode control unit or garage mode control system may be applied in the garage mode control method.

According to the present application, for the most part, existing hardware of a vehicle is used to actively avoid erroneous acceleration in the control of the vehicle in a cramped place; hence, the problem of increased vehicle cost caused by the addition of this function can be avoided or at least alleviated. In addition, in the present application, erroneous acceleration of the vehicle is actively prevented by curbing the vehicle's acceleration, therefore safety can be improved more reliably when controlling the vehicle in a cramped place.

BRIEF DESCRIPTION OF THE DRAWINGS

The abovementioned and other aspects of the present application will be understood more completely through the following detailed presentation which makes reference to the accompanying drawings, wherein.

DETAILED DESCRIPTION

The present application relates generally to a technology for actively preventing accidental acceleration of a vehicle when in a cramped place. Cramped places may include parking places such as garages, areas with a high density of pedestrians, etc.; a cramped place is a place in which the degree of difficulty of vehicle control is high.

Figure 1:
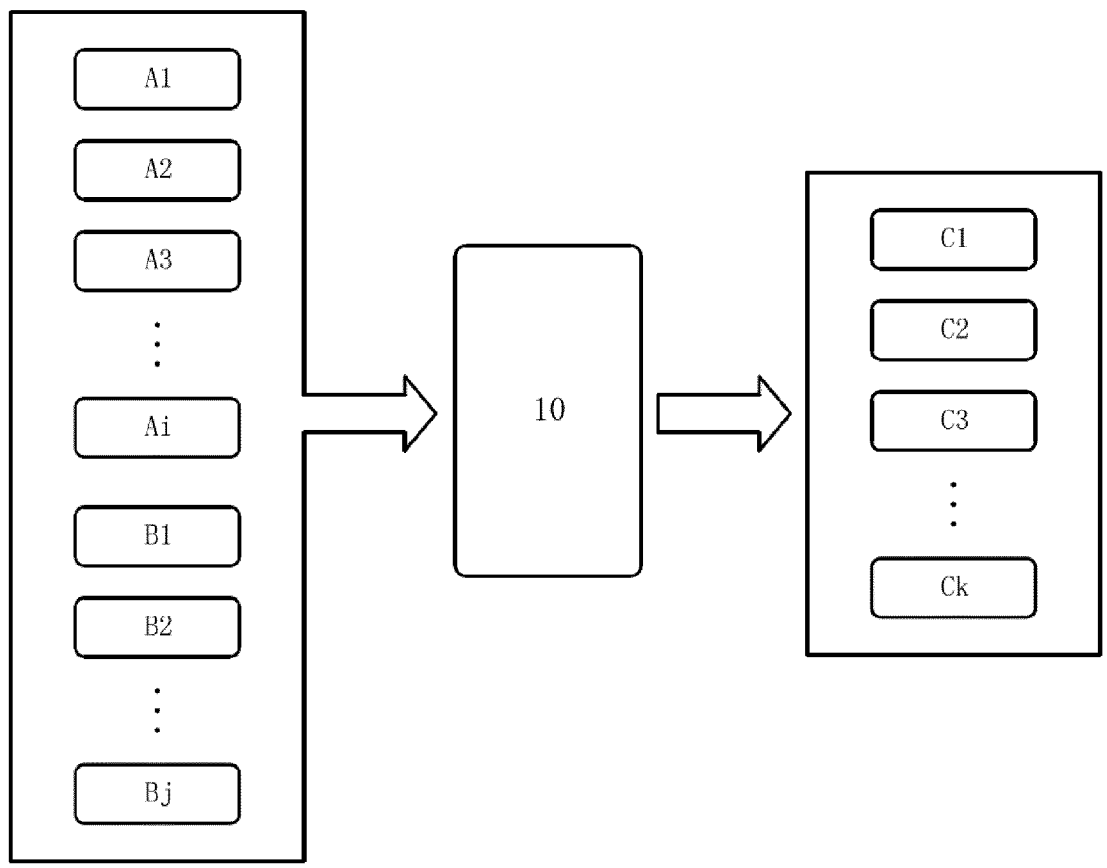
FIG. 1 is a schematic diagram of a garage mode control technology according to the present application.

The technology of the present application may be realized by a garage mode control unit 10 shown in FIG. 1. The garage mode control unit 10 has an information transmission port and an internal processing module; the garage mode control unit 10 receives detection information A1, A2, A3 . . . Ai via the information transmission port, uses an algorithm in the internal processing module to generate garage mode control signals C1, C2, C3 . . . Ck on the basis of these items of detection information, and issues the garage mode control signals via the information transmission port.

Specifically, the detection information A1-Ai may comprise: vehicle environment information and vehicle state information.

The vehicle environment information may be used to determine whether the vehicle is in a cramped place in which the driver must control the vehicle with great care, in order to determine whether to activate the garage mode. For example, the vehicle environment information may comprise a parking radar signal, an ambient brightness signal (a low level of ambient brightness will cause the driver's view to be restricted, increasing the difficulty of vehicle control), a rain quantity sensor signal (a large quantity of rain will cause the driver's view to be obstructed, increasing the difficulty of vehicle control), etc.

The vehicle state information may be used to determine a vehicle control parameter in the garage mode. For example, the vehicle state information may comprise: a braking torque, motive power source torque, motive power source rotation speed, vehicle speed, wheel speed, current gear, degree of opening of an accelerator pedal, braking signal switch and steering wheel rotation angle. In addition, the vehicle state information may further comprise a wheel acceleration, transmission ratio, central differential torque, etc.

In addition, in order to improve the performance of the garage mode control unit 10, it may also receive additional detection information B1, B2 . . . Bj. These items of additional detection information B1-Bj are optional, but not required; for example, they may comprise the following additional vehicle environment information, for determining more reliably whether to activate the garage mode: camera information, GPS information, vehicle separation sensor information, etc.

The garage mode control signals C1-Ck generated by the garage mode control unit 10 may comprise: a garage mode trigger signal, and a vehicle control parameter in the garage mode. The vehicle control parameter may comprise: a vehicle speed limit value, a target gear, a motive power source target torque, a target braking force (e.g. a target braking flow rate), etc.

The garage mode control unit 10 determines whether it is necessary to activate the garage mode on the basis of the data A1-Ai. Specifically, the garage mode control unit 10 confirms whether the vehicle is in a cramped place on the basis of the vehicle environment information (and may also determine the degree of difficulty of vehicle control in the place). If it is determined that the vehicle is in a cramped place, the garage mode control unit 10 issues a garage mode trigger signal, to cause the vehicle to enter the garage mode. The garage mode control unit 10 then determines a vehicle control parameter in the garage mode on the basis of the vehicle state information.

The vehicle control parameter is determined principally on the basis of the vehicle state information, and may also take into account a factor of the vehicle environment information (especially ambient brightness, rain quantity, etc.).

The internal processing module can automatically adjust the vehicle control parameter in real time on the basis of the vehicle state information updated in real time.

The vehicle control parameter in the garage mode may comprise a vehicle speed limit value when the vehicle is advancing and reversing. For example, in an advancing state of the vehicle, a maximum vehicle speed may be limited to approximately 20 kph, which is also the vehicle speed limit value in the majority of garages. In a reversing state of the vehicle, the maximum vehicle speed may be limited to approximately 5-10 kph, which is a special calibration value for each vehicle model. It must be pointed out that the specific value of the vehicle speed limit value in the garage mode may be adjusted by the garage mode control unit 10 according to the degree of difficulty of vehicle control in the place. For example, if objects are present at close proximity in the vicinity of the vehicle (e.g. other vehicles or installations or people), or the ambient brightness in the place is low, or the quantity of rain is large, etc., then the garage mode control unit 10 will reduce the vehicle speed limit value.

Setting the vehicle speed limit value ensures that the vehicle cannot accelerate suddenly, even if the driver depresses the accelerator pedal, mistaking it for the brake pedal. By controlling the motive power source target torque of the vehicle (e.g. engine output torque, electric machine output torque of an electric vehicle or hybrid vehicle, etc.), the vehicle speed can be kept within an optimum speed limit. If necessary, e.g. if the vehicle speed is increasing towards the vehicle speed limit value and exhibits a tendency towards exceeding the vehicle speed limit value, the vehicle speed may be curbed by means of a braking operation (realizing the target braking force) of a vehicle braking system.

In order to ensure prompt and reliable operation of the braking system, once the garage mode control unit 10 has issued the garage mode trigger signal and the garage mode has been entered, if the driver has not depressed the accelerator pedal, the braking system may enter a braking standby state, e.g. such that the gap between a brake caliper and a brake disc is reduced, or is even nearly zero (critical contact).

In the garage mode, if the driver depresses the accelerator pedal with sudden force, then the garage mode control unit 10 determines that the driver has performed an erroneous operation, based on the degree of opening of the accelerator pedal and the rate of change of the degree of opening of the accelerator pedal being greater than a corresponding threshold, and does not execute an acceleration operation.

Figure 2:
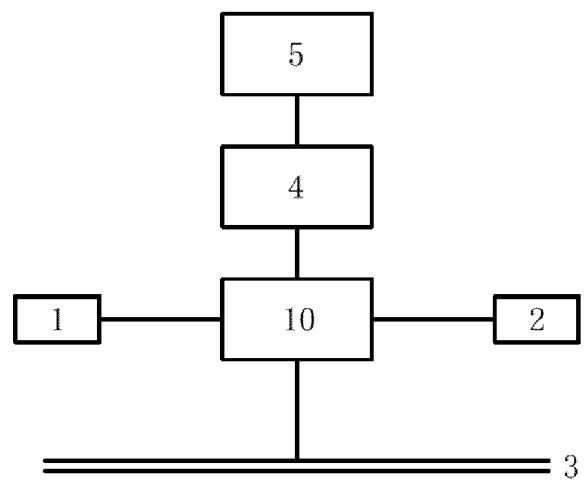
FIG. 2 is a schematic block diagram of a garage mode control system according to a feasible embodiment of the present application.

In the present application, the garage mode control unit 10 is used as a foundation to construct a garage mode control system. As shown in FIG. 2, the garage mode control system principally comprises: the garage mode control unit 10; an information detection element 1, a human-machine interface 2, a vehicle data bus 3 and a vehicle control unit 4 which are each connected to the garage mode control unit 10 in a manner allowing signal transmission; and a vehicle braking system 5, connected to the vehicle control unit 4 in a manner allowing signal transmission.

The garage mode control unit 10 acquires the detection information A1-Ai (and possible additional detection information B1, B2 . . . Bj) from the information detection element 1 and the vehicle data bus 3. The information detection element 1 may comprise a parking radar, an ambient brightness sensor, a rain quantity sensor (and a possible camera, GPS receiver, vehicle separation sensor), etc., for receiving corresponding detection information. Other detection information may be acquired from the vehicle data bus 3 and/or the vehicle control unit 4.

The human-machine interface 2 may comprise a garage mode push-button, an audio and/or video prompt component, etc. The driver can activate the garage mode manually by pressing the garage mode push-button, or forcibly exit the garage mode. The audio and/or video prompt component may be an existing sound system and/or display screen of the vehicle. Once the garage mode control unit 10 has issued the garage mode trigger signal, a corresponding prompt may be issued to the driver by means of the audio and/or video prompt component, to remind the driver to pay attention to the current state, and not abruptly depress the accelerator pedal, etc. If the driver believes that there is no need for the garage mode control system to apply the garage mode to the vehicle, the driver can forcibly exit the garage mode by means of the garage mode push-button.

The vehicle control unit 4 may comprise a whole-vehicle control unit, which can control a vehicle motive power output (possibly also comprising a drive train state, transmission gear, etc.) and operation of the vehicle braking system 5.

According to an alternative embodiment, the vehicle control unit 4 comprises a vehicle motive power source management unit (e.g. an engine management unit), for controlling a motive power output of a vehicle motive power source. In this embodiment, the garage mode control unit 10 may be connected to the vehicle braking system 5 in a manner allowing signal transmission, in order to directly control operation of the vehicle braking system 5.

According to another alternative embodiment, the vehicle control unit 4 comprises an electronic vehicle body stability system, which can control a vehicle motive power output and operation of the vehicle braking system 5.

Optionally, the garage mode control unit 10 may be constructed as a part of the vehicle control unit 4 (in the form of hardware and/or software).

Those skilled in the art will understand that based on the principles of the present application, various solutions may be constructed in which the garage mode control unit 10 directly or indirectly controls output of the vehicle motive power source and operation of the vehicle braking system 5.

The present application further provides a garage mode control method, which can be implemented via the garage mode control unit 10 described above and/or by the garage mode control system described above.

Figure 3:
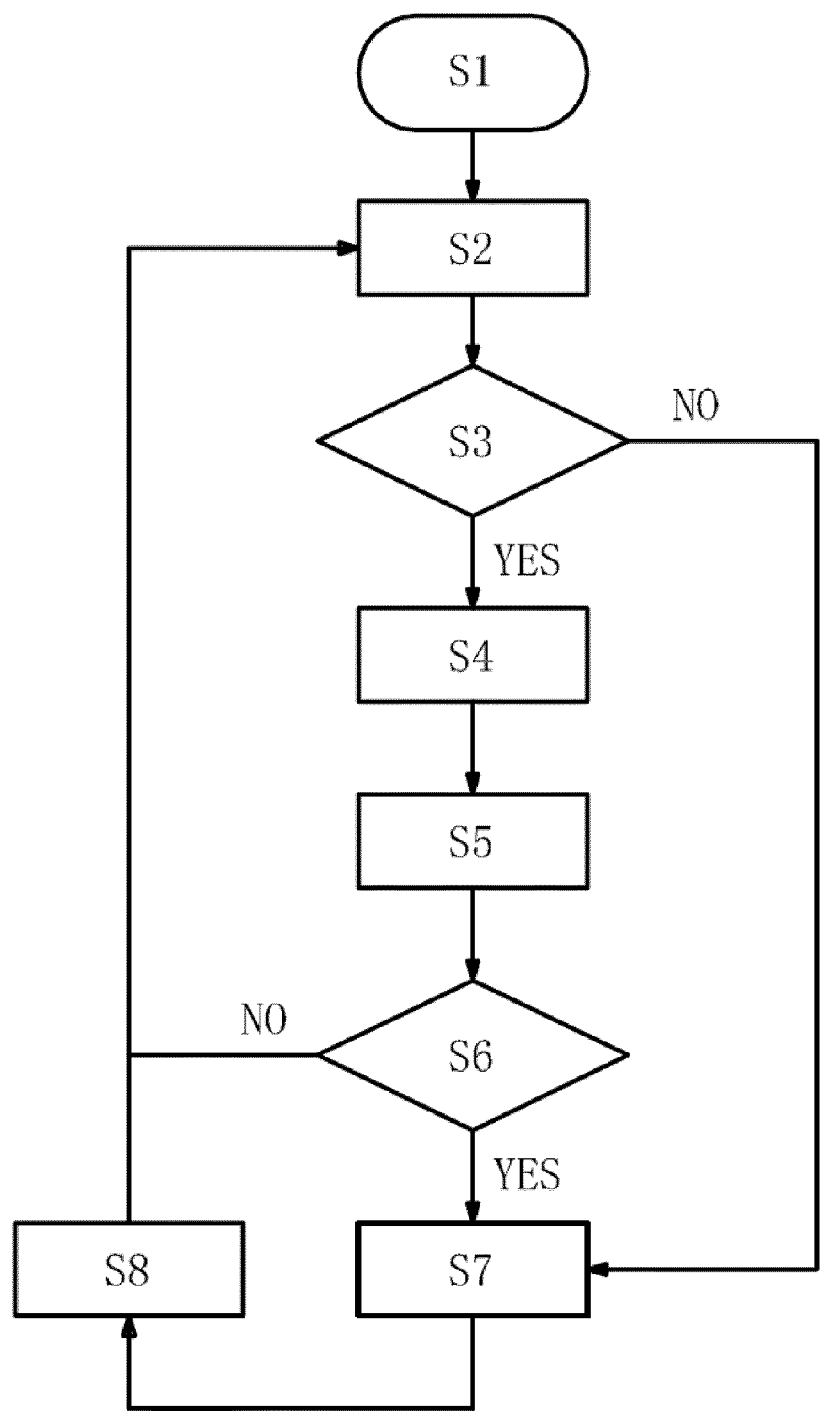
FIG. 3 is a schematic flow chart of a garage mode control method according to a feasible embodiment of the present application.

FIG. 3 shows a demonstrative procedure of a garage mode control method of the present application, described as follows.

In step S1, a garage mode control program is initiated. The program can be executed automatically once a vehicle has started.

Next, in step S2, vehicle environment information is collected (e.g. acquired by the abovementioned information detection element 1, vehicle data bus 3 and/or vehicle control unit 4).

Next, in step S3, a determination is made as to whether the vehicle is in a cramped place, based on the vehicle environment information (the factor of control difficulty is also taken into account). If the result of determination is negative, go to step S7; if the result of determination is positive, go to step S4.

In step S4, a garage mode trigger signal is issued, and a prompt is issued to a driver (e.g. via the abovementioned audio and/or video prompt component).

Next, in step S5, a garage mode is entered, wherein vehicle state information is collected and, based on a vehicle speed limit value, a garage mode control signal is determined; based on the garage mode control signal, a motive power output of a vehicle motive power source, a drive train state and a transmission gear are controlled (and a vehicle braking system 5 is possibly controlled such that it enters or maintains a braking standby state, and the vehicle braking system 5 brakes the vehicle if necessary). It must be pointed out that the garage mode may be forcibly entered by the driver (e.g. by the abovementioned input via a human-machine interface, in particular a garage mode push-button).

Next, in step S6, a determination is made as to whether there is an instruction to forcibly exit the garage mode (e.g. inputted by the driver via a human-machine interface, in particular a garage mode push-button). If the result of determination is negative, go back to step S2; if the result of determination is positive, go to step S7.

In step S7, the garage mode is exited; then, after a delay step S8, step S2 is returned to. A delay in the delay step S8 may be a few minutes or a longer time, and may be designed to be adjustable.

It will be understood that, based on the principles of the present application, those skilled in the art can construct various specific steps used in the garage mode control method.

It can be seen that the garage mode control method, garage mode control unit and garage mode control system of the present application mainly use existing hardware of a vehicle to actively avoid erroneous acceleration in the control of the vehicle in a place in which the degree of difficulty of vehicle control is high, with no need to add new devices for this purpose (or with no need to add an excessive number of devices), and can therefore avoid/alleviate the problem of increased vehicle cost caused by the addition of this function. In addition, in the present application, erroneous acceleration of the vehicle is prevented by actively curbing the vehicle's acceleration (auxiliary braking may need to be used), therefore safety can be improved more reliably when controlling the vehicle in a place in which the degree of difficulty of vehicle control is high.

It will be understood that the various features described above can be generally applied in the garage mode control unit, control system and control method.

Although the present application has been described here with reference to particular embodiments, the scope of the present application is not limited to the details shown. Various amendments may be made to these details without departing from the basic principles of the present application.

The invention claimed is:

1. A controller of a vehicle for controlling a garage mode of the vehicle, the controller comprising:
an information transmission port configured to receive vehicle environment information and vehicle state information, the vehicle environment information being measured by sensors of the vehicle; and
an internal processor configured to:
determine whether the vehicle is in a cramped place based on the vehicle environment information, the cramped place being a place in which objects are within a threshold proximity of the vehicle;
in response to determining that the vehicle is in a cramped place, generate and transmit via the information transmission port a garage mode control signal, the garage mode control signal being configured to trigger a garage mode in which the vehicle is controlled depending on at least one vehicle control parameter for the garage mode, the at least one vehicle control parameter including a vehicle speed limit; and
determine, in the garage mode, that a vehicle speed is increasing towards the vehicle speed limit value, and, in response thereto, generate a signal configured to activate a vehicle braking system to brake the vehicle.

2. The controller according to claim 1, wherein the vehicle environment information includes a parking radar signal.

3. The controller according to claim 2, wherein the vehicle environment information further includes at least one of an ambient brightness signal and a rain quantity sensor signal.

4. The controller according to claim 2, wherein the vehicle environment information further includes at least one of camera information, GPS information, and vehicle separation sensor information.

5. The controller according to claim 1, wherein the vehicle state information includes at least one of a braking torque, a motive power source torque, a motive power source rotation speed, a vehicle speed, a wheel speed, a current gear, a degree of opening of an accelerator pedal, a braking signal switch, a steering wheel rotation angle, a wheel acceleration, a transmission ratio, and a central differential torque.

6. The controller according to claim 5, wherein the vehicle state information comprises all of the braking torque, the motive power source torque, the motive power source rotation speed, the vehicle speed, the wheel speed, the current gear, the degree of opening of the accelerator pedal, the braking signal switch and the steering wheel rotation angle.

7. The controller according to claim 1, wherein:
the at least one vehicle control parameter further includes a target gear, a motive power source target torque, and a target braking force; and
the vehicle control parameter is determined based on the vehicle state information.

8. The controller according to claim 7, wherein (i) the vehicle speed limit value when the vehicle is advancing is approximately 20 kph and (ii) the vehicle speed limit value when the vehicle is reversing is approximately 5-10 kph.

9. The controller according to claim 7, wherein the vehicle control parameter is determined further based on a factor of the vehicle environment information.

10. The controller according to claim 7, wherein the internal processor automatically adjusts the vehicle control parameter based on the vehicle state information.

11. The controller according to claim 8, wherein the internal processor automatically adjusts the vehicle speed limit value based on the vehicle environment information.

12. The controller according to claim 1, wherein, in response to an accelerator pedal not being depressed by a driver, the garage mode control signal is further configured to set a vehicle braking system to a braking standby state in which a gap between a brake caliper and a brake disc is reduced.

13. The controller according to claim 12, wherein, in response to the accelerator pedal not being depressed by the driver, the garage mode control signal is further configured to set the vehicle braking system to a critical braking state.

14. The controller according to claim 1, wherein the garage mode control signal further includes at least one of an audio signal and a video signal configured to prompt a driver about the garage mode.

15. The controller according to claim 1, wherein the controller is operably connected to a vehicle data bus so as to enable signal transmission, and is one of integrated in a vehicle controller and connected to the controller so as to enable signal transmission, the vehicle controller being one of (i) a whole-vehicle controller, (ii) a vehicle motive power source management device for at least one of a vehicle drive electric machine and an engine, and (iii) an electronic vehicle body stability system.

16. A control system for controlling a garage mode of a vehicle, the control system comprising:
a controller of the vehicle having:
an information transmission port configured to receive vehicle environment information and vehicle state information, the vehicle environment information being measured by sensors of the vehicle; and
an internal processor configured to (i) determine whether a vehicle is in a cramped place based on the vehicle environment information, the cramped place being a place in which objects are within a threshold proximity of the vehicle, (ii) in response to determining that the vehicle is in a cramped place, generate and transmit via the information transmission port a garage mode control signal, the garage mode control signal being configured to trigger a garage mode in which the vehicle is controlled depending on at least one vehicle control parameter for the garage mode, the at least one vehicle control parameter including a vehicle speed limit, and (iii) determine, in the garage mode, that a vehicle speed is increasing towards the vehicle speed limit value, and, in response thereto, generate a signal configured to activate a vehicle braking system to brake the vehicle;

an information detection element connected to the controller so as to enable signal transmission; and a human-machine interface connected to the controller so as to enable signal transmission.

17. A method for controlling a garage mode of a vehicle, the method comprising:

receiving, with an information transmission port of a controller of the vehicle, vehicle environment information, the vehicle environment information being measured by sensors of the vehicle;

determining, with an internal processor of the controller, whether a vehicle is in a cramped place based on the vehicle environment information, the cramped place being a place in which objects are within a threshold proximity of the vehicle;

controlling the vehicle in a garage mode in response to determining that the vehicle is in a cramped place, the vehicle being controlled in the garage mode depending on at least one vehicle control parameter for the garage mode, the at least one vehicle control parameter including a vehicle speed limit; and determining, in the garage mode, that a vehicle speed is increasing towards the vehicle speed limit value, and, in response thereto, generate a signal configured to activate a vehicle braking system to brake the vehicle.

* * * * *